(12) United States Patent
Becker et al.

(10) Patent No.: US 9,150,124 B2
(45) Date of Patent: Oct. 6, 2015

(54) ACTUATING UNIT OF A MOTOR VEHICLE SEAT

(75) Inventors: Burckhard Becker, Sollngen (DE); Daniel Urban, Sollngen (DE); Antal Teer, Mettmann (DE)

(73) Assignee: C. ROB. HAMMERSTEIN GMBH & CO. KG (DE)

( * ) Notice: Subject to any disclaimer, the term of this patent is extended or adjusted under 35 U.S.C. 154(b) by 0 days.

(21) Appl. No.: 12/913,514

(22) Filed: Oct. 27, 2010

(65) Prior Publication Data

US 2011/0042540 A1 Feb. 24, 2011

Related U.S. Application Data

(63) Continuation of application No. PCT/EP2009/054254, filed on Apr. 8, 2009.

(30) Foreign Application Priority Data

Apr. 28, 2008 (DE) .......................... 10 2008 021 123

(51) Int. Cl.
*F16M 13/00* (2006.01)
*B60N 2/07* (2006.01)
*B60N 2/08* (2006.01)
*B60N 2/44* (2006.01)

(52) U.S. Cl.
CPC ............ *B60N 2/0705* (2013.01); *B60N 2/0806* (2013.01); *B60N 2/0818* (2013.01); *B60N 2/0843* (2013.01); *B60N 2/0875* (2013.01); *B60N 2/0881* (2013.01); *B60N 2/442* (2013.01)

(58) Field of Classification Search
CPC .... B60N 2/086; B60N 2/0818; B60N 2/0843; B60N 2/0875; B60N 2/0881; B60N 2/0705; B60N 2/442

USPC ......... 248/424, 429, 430, 431, 560, 577, 592, 248/408; 384/34, 47; 296/65.01, 65.13, 296/65.15; 297/344.11
See application file for complete search history.

(56) References Cited

U.S. PATENT DOCUMENTS

| | | | |
|---|---|---|---|
| 2,285,616 A * | 6/1942 | Saunders et al. | ................ 384/47 |
| 4,189,957 A | 2/1980 | Gedig et al. | |
| 6,354,553 B1 * | 3/2002 | Lagerweij et al. | ............ 248/430 |
| 7,506,856 B2 * | 3/2009 | Ikegaya et al. | ................ 248/430 |
| 7,588,293 B2 * | 9/2009 | Kojima | ....................... 297/344.1 |
| 7,758,008 B2 * | 7/2010 | Kojima et al. | ................ 248/430 |
| 8,033,520 B2 * | 10/2011 | Fujieda et al. | ................ 248/430 |

(Continued)

FOREIGN PATENT DOCUMENTS

| | | |
|---|---|---|
| DE | 24 11 414 A1 | 9/1974 |
| DE | 10 2004 057 106 A1 | 9/2005 |

(Continued)

OTHER PUBLICATIONS

International Search Report of PCT/EP2009/054254 mailed Jun. 22, 2009.

*Primary Examiner* — Todd M Epps
(74) *Attorney, Agent, or Firm* — McCarter & English, LLP

(57) ABSTRACT

An actuating unit of a motor vehicle seat comprises an actuating element, a base part, a pivot axis, and a spring. The pivot axis is disposed between the base part and the actuating element and enables a pivoting movement of the actuating element relative to the base part. The spring is disposed between the actuating element and the base part and elastically biases the actuating element into a rest position relative to the base part.

15 Claims, 4 Drawing Sheets

(56) References Cited

U.S. PATENT DOCUMENTS

| | | | |
|---|---|---|---|
| 8,052,113 B2* | 11/2011 | Moriyama et al. | 248/430 |
| 2003/0230696 A1* | 12/2003 | Yamada et al. | 248/424 |
| 2010/0243853 A1* | 9/2010 | Moriyama et al. | 248/429 |

FOREIGN PATENT DOCUMENTS

| | | |
|---|---|---|
| DE | 10 2005 026 861 A1 | 7/2006 |
| FR | 2 406 538 A | 5/1979 |
| GB | 2 119 640 A | 11/1983 |

* cited by examiner

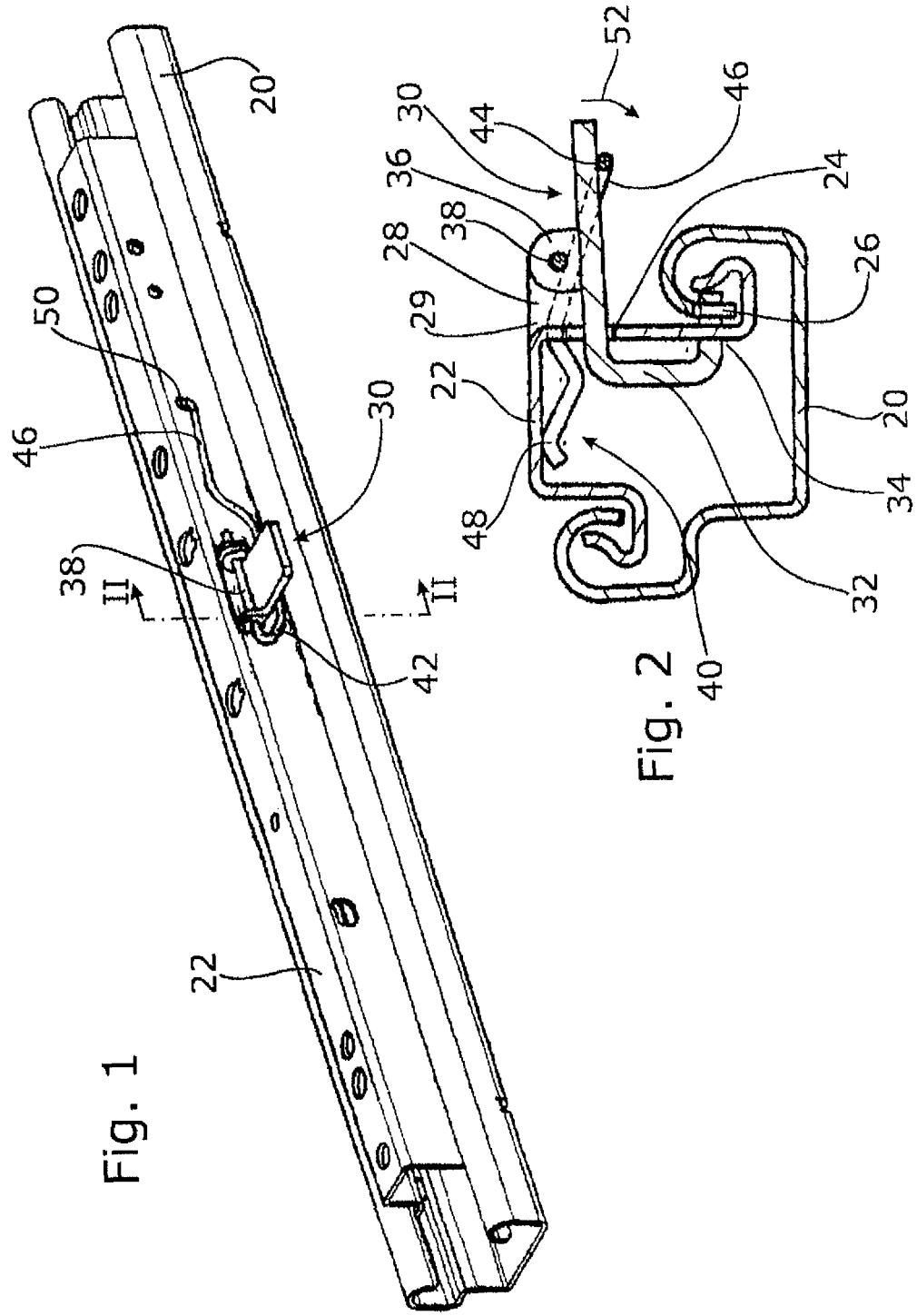

ACTUATING UNIT OF A MOTOR VEHICLE SEAT

CROSS-REFERENCE TO RELATED APPLICATIONS

This application is a continuation of International Patent Application No. PCT/EP2009/054254, filed on Apr. 8, 2009 and claims priority to German Patent Application 10 2008 021 123.0, filed Apr. 28, 2008. The entire disclosure of both of these applications is incorporated by reference herein.

FIELD OF THE INVENTION

The invention relates to an actuating unit of a motor vehicle seat, comprising an actuating element, a base part, a pivot axis, which is disposed between the base part and the actuating element and enables a pivoting movement of the actuating element relative to the base part, and a spring, which is disposed between the actuating element and the base part and elastically biases the actuating element into a rest position relative to the base part.

BACKGROUND OF THE INVENTION

U.S. Pat. No. 2,285,616 discloses an actuating unit of a motor vehicle seat. In this case, the base part is formed as a beam which is rigidly connected to the seat rail. The actuating element is a locking lever comprising a locking member engaging into a latching strip connected in the floor rail. A pivot axis is disposed parallel to the longitudinal adjustment direction of the rails, it reaches through bearing openings of the base part and the actuating element. Finally, a spring is provided, which is fitted onto the pivot axis, is supported by the base part on the one hand and by the actuating element on the other hand, and which elastically biases the actuating element into a rest position relative to the base part, wherein this rest position is the engaging position into the latching strip.

Such actuating units have proved themselves in principle; they have been used for a long time. Nevertheless, they have drawbacks. For example, the installation effort is considerable. Though the pivot axis is easy to install, it must, however, be secured against axial movement by additional means. Additional room is required on the pivot axis for accommodating the spring. The spring must be hooked in separately after it has been pushed onto the pivot axis. The known actuating unit has many separate parts.

SUMMARY OF THE INVENTION

The present invention further develops the known actuating unit to simplify storage and installation.

In accordance with the invention, the components pivot axis and spring, which had hitherto always been formed to be separate, are now combined in an integral spring element. Together with its axis part, this spring element forms the pivot axis. This axis part is also mounted in a way corresponding to that of the pivot axis according to the prior art. However, the axis part does not have to be axially secured by additional means such as stopping elements as used in the prior art, rather, no separate stopping elements are allocated to the axis part itself. The axis part is axially secured by at least one remaining partial area of the spring element being retained in at least one location. It is advantageous for this purpose if a retaining means fixing the second end portion of the spring element is provided on the base part or on the actuating element.

Preferably, the axis part of the spring element also acts as a support for the elastic action of the spring element. A separate counter-bearing, for example a hole for hooking in the spring in accordance with the prior art, becomes superfluous. The spring part of the actuating unit according to the invention preferably is not configured anymore as a helical or leg spring, but preferably has a sufficiently long spring leg which provides the spring deflection required for the pivoting movement.

Preferably, the spring element has a supporting part which is in elastic contact with the actuating element. Optionally, it can execute a relative movement relative to the actuating element during the pivot actuation of the actuating element.

On the whole, the invention makes it possible to install the entire combined component, that is, the spring element, with the same installation effort required in the prior art for installing the spring alone. The installation effort for installing a separate pivot axis and axially securing it can be omitted.

Preferably, the spring element is produced from a bar material with a round cross section. The cross section is dimensioned sufficiently for the axis part to have a sufficient cross section in the bearing area; for example, the diameter of the cross section is greater than one, preferably than 1.5 mm.

BRIEF DESCRIPTION OF THE DRAWINGS

Other advantages and features of the invention will become apparent from the other claims as well as from the following description of exemplary embodiments of the invention, which are to be understood not to be limiting and which will be explained below with reference to the drawing. In the drawings:

FIG. 1: shows a perspective view of a longitudinal adjustment device with a pair of rails;

FIG. 2: shows a cut along the sectional plane designated II-II in FIG. 1;

DETAILED DESCRIPTION OF THE PREFERRED EMBODIMENTS

Figure 3:
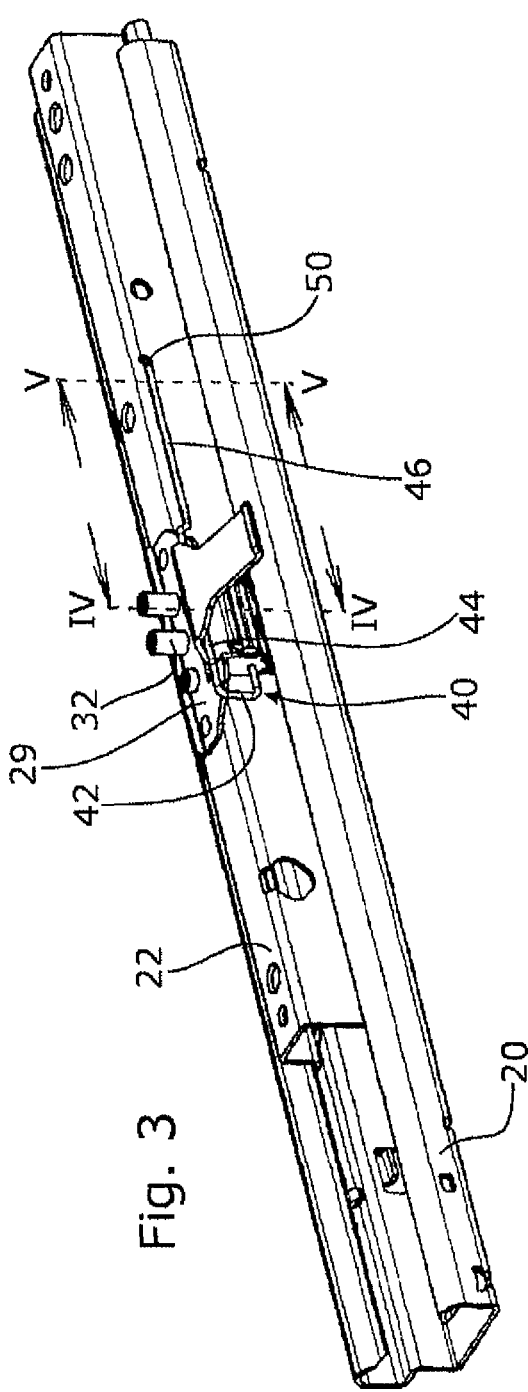
FIG. 3: shows a perspective view of a longitudinal adjustment device as in FIG. 1, but in this case with a multi-pin locking device.
Figure 5:
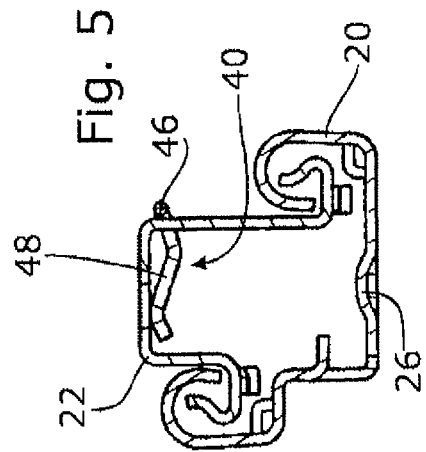
FIG. 5: shows a cut along the sectional plane V-V in FIG. 3 or FIG. 6 at an enlarged scale.
Figure 4:
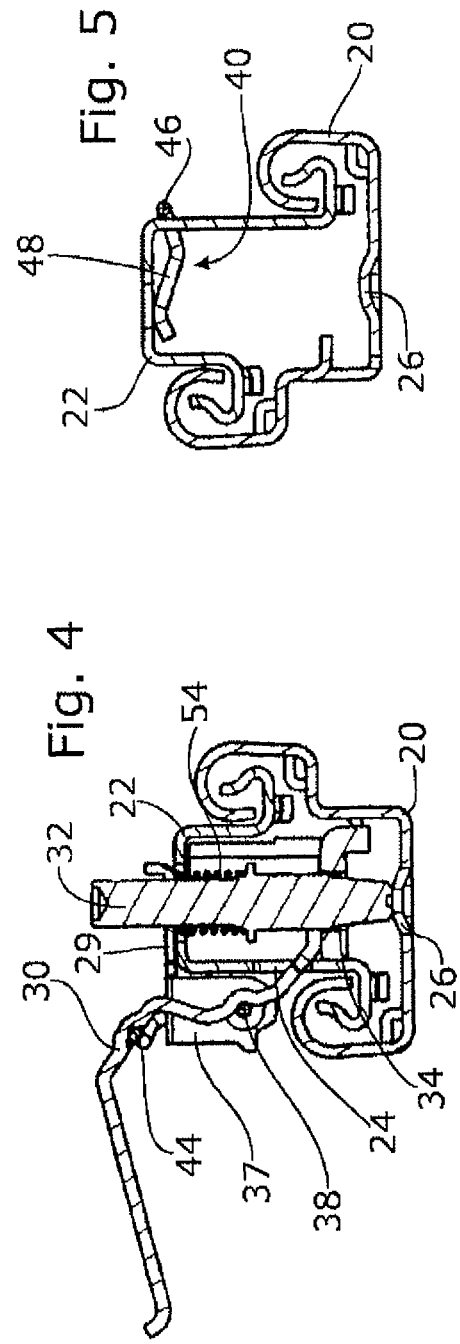
FIG. 4: shows a cut along the sectional plane IV-IV in FIG. 3 at an enlarged scale.
Figure 6:
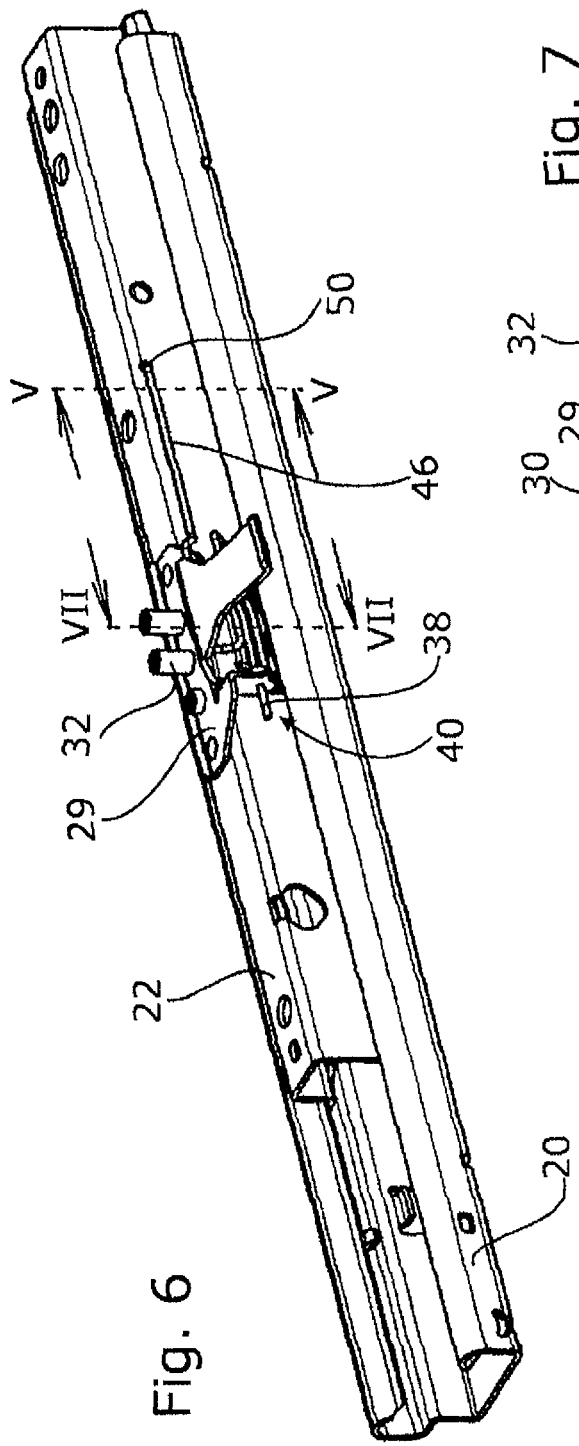
FIG. 6: shows a perspective view of a longitudinal adjustment device as in FIG. 3, but in this case for a push-in installation of the axis part in the reversed longitudinal direction, namely from the right.
Figure 7:
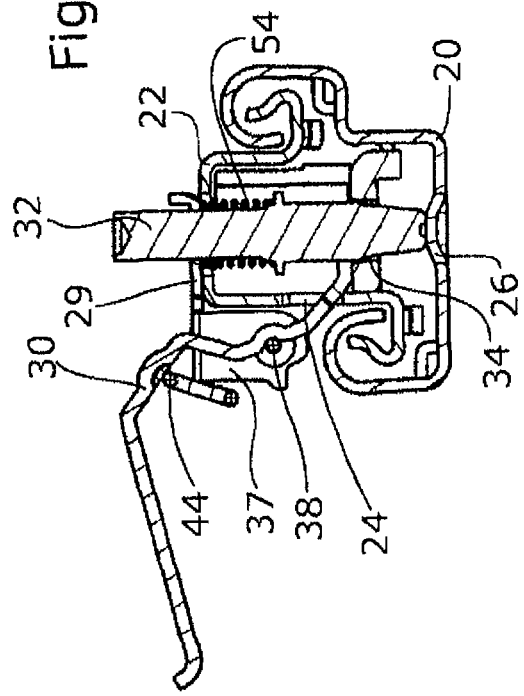
FIG. 7: shows a cut along the sectional plane VII-VII in FIG. 6 at an enlarged scale.
Figure 8:
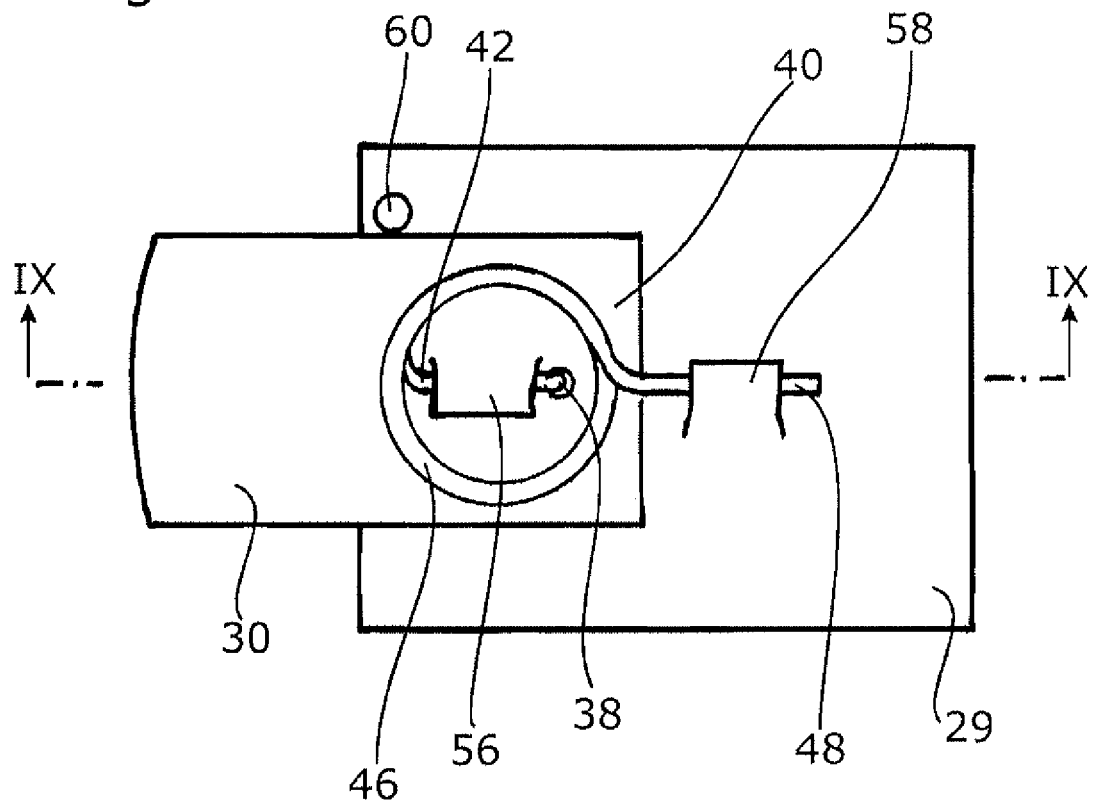
FIG. 8: shows a top view onto an actuating unit in the form of a pivotable cam pivoted relative to a base part.
Figure 9:
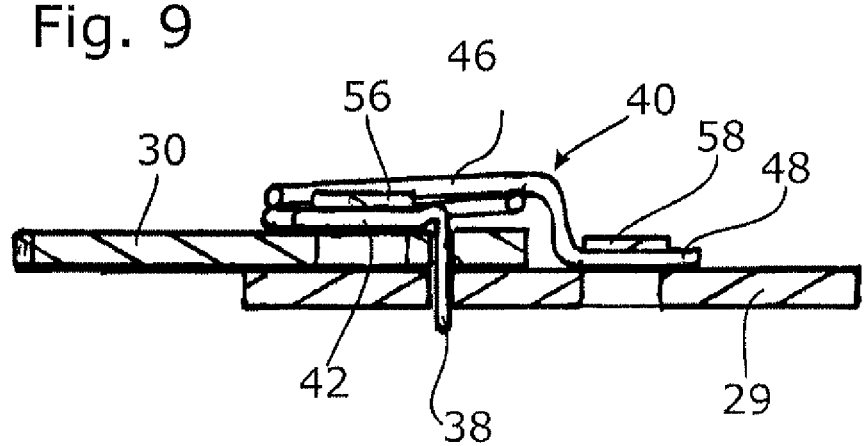
FIG. 9: shows a cross-sectional view along the line of cut IX-IX in FIG. 6.

The inventive actuating unit according to the first three exemplary embodiments, that is, FIG. 1 and FIG. 2 for the first exemplary embodiment, FIG. 3 to FIG. 5 for the second exemplary embodiment, and FIG. 6 and FIG. 7 for the third exemplary embodiment, is provided in each case with a pair of rails for a longitudinal adjustment device. The pair of rails has a floor rail 20 and a seat rail 22. A window 24 is formed in the seat rail 22. The floor rail 20 forms a latching strip 26. Two bearing blocks 28 protrude on the seat rail 22, transverse to the longitudinal direction of the rail 20, 22; they form a base part 29 and have a bearing opening each.

The first exemplary embodiment, in particular, is described below: an actuating element 30 is provided which is inserted through the window 24 in the seat rail 22. The actuating element 30 comprises a blocking arm 32 which reaches through a shearing opening 34 of the seat rail 22 and is in engagement with the latching strip 26. With is free end, it lies in the immediate vicinity of a free leg of the seat rail 22. It may or may not be in contact with this free leg. The actuating element 30 comprises bearing pieces 36 bent upwards, in each of which a bearing opening is located.

The base part 29 is firmly connected with the seat rail 22. The base part 29 is formed by two bearing blocks 28, the two bearing blocks 28 are cut free from the material and bent out of the seat rail 22; they each comprise a bearing opening.

The above-described bearing openings of the base part 29 and of the actuating element 30 are aligned. An axis part 38 of a spring element 40 is pushed through them. The axis part 38 forms a first end portion of the spring element 40. Subsequent to the axis part 38, the spring element 40 furthermore comprises a transverse part 42 extending transversely to the longitudinal direction of the rails 20, 22. In turn, this transverse part 42 transitions into a support part 44. This is followed in turn by a spring portion 46. The second end portion 48 follows the spring portion 46; the end portion is pushed through a hole 50 of the seat rail 22 and fixed therein. A retaining means for the second end portion 48 is thus formed.

The actuating element 30 is designed as a two-armed lever. The outer lever arm, just like in the prior art, is provided with or connected to a handle (not shown). The support part 44 rests elastically on the underside of the outer lever arm. If the actuating element 30 is pivoted out of the rest position shown and in accordance with the arrow 52 in order to release the locking device, the spring portion 46 deforms; the support part 44 can also be displaced relative to the actuating element 30 in the process. The spring portion 46 can be rectilinear, but it may also have at least one bend, as shown. It is configured such that the desired elastic force is provided at the actuating element 30.

The second exemplary embodiment will be discussed below; in particular, differences to the first exemplary embodiment will be explained. In the second exemplary embodiment, the base part 29 is a separate part connected to the seat rail 22. Bearing openings are once again formed. An actuating element 30, which is pushed through the window 24 of the seat rail, is also provided. However, it does not itself have a locking function in this case. Rather, a number of arresting pins 32 as they are known in principle from the prior art, see for example U.S. Pat. No. 4,189,957, are provided. From the latched position of at least one of the arresting pins 32, which is normally provided (in this regard, see FIG. 4), all arresting pins 32 are pulled free into a release position against the action of an engaging spring 54 by a fork arrangement, which is provided on the inner lever arm of the actuating element 30, reaching under the arresting pins 32 on a collar, on which the engaging spring 54 is also supported, and pushing them free. The engaging springs 54 are located within a channel cavity enclosed by the two rails 20, 22. In order to be able to install the arresting pins 32 including their engaging springs 564 sufficiently large holes are provided in the upper flange of the seat rail 22, After the installation of the arresting pins 32 including their engaging springs, the base part 29 is installed from above; it has openings for the arresting pins 32 which are adapted to the diameter of the arresting pins 32 themselves and are smaller then the holes of the seat rail 22. Thus, the engaging spring 54 can support itself on the underside of the base part 29.

The base part 29, in the area in which it is in contact with the axis part 38, either has a bead in which the axis part 38 gathers, or partial areas of the actuating element 30 are cut free transversely to the direction of the pivot axis and deformed in such a way that they are able to reach over the axis part 38, so that, on the whole, a channel for the axis part 38 is formed. In contrast to the first exemplary embodiment, the support part 44 lies in a bead formed at the outer lever arm. It position is fixed thereby.

The third exemplary embodiment according to the FIGS. 6 and 7 differs from the second exemplary embodiment with regard to the installation direction when the axis part 38 is inserted. Whereas this installation is carried out in the second exemplary embodiment from the left hand side, that is, in the direction of the arrow for the cut V-V, the axis part 38 is inserted from the right hand side in the third embodiment. In order to make this possible, the transverse part 42 can now be found on the other side of the base part 29, and a partial piece of the spring element 40 extending parallel to the axis part 38 or the support part 44 is now additionally provided between the transverse part 42 and the support part 44. The spring element 40 now extends in an S-shape.

The fourth exemplary embodiment shows an actuating unit as it is used at another location of the seat, that is, outside of the longitudinal guide, e.g. an arresting cam as it is known from DE 10 2005 026 861 A1 as component (64); it is used to fix a backrest in a position folded forward. However, the actuating unit may also fulfill other functions, for example, be a handle for triggering the seat to fold forward, as it is describe as component (32) in DE 10 2004 057 106 A1.

The base part 29 is now a partial piece of a seat support or of a backrest support or of another component of the seat. The actuating element 30 is designed as a cam. It can pivot about a pivot axis defining the axis part 38. This axis part 38 reaches through a bearing bore in the base part 29 and a bearing bore in the actuating element 30. Again, the axis part 38 forms a first end portion of the spring element 40. The subsequent transverse part 42 is fixed underneath a pushed-up flap 56, which is pushed out of the material of the actuating element 30. Though it may come clear therefrom in a downward direction, that is, by counter-clockwise rotation about the pivot axis, but is prevented from doing so by the spring force of the spring element 40. The spring element 40 then has one and a half windings and then merges towards the right side into the second end portion 48. The latter reaches under a retaining part 58 which is formed similar to the flap 56 but points in the opposite direction and is now formed from the material of the base part 29. It is possible to push the flap 56 and/or the retaining part 58 downwards at the free end once the installation has been carried out, in order thus to mechanically fix the transverse part 52 or the second end portion 48.

A stop 60 is provided against which the cam, that is, the actuating element 30, rests elastically. The stop 60 protrudes from the base part 29.

What is claimed is:

1. An actuating unit of a motor vehicle seat, comprising: an actuating element; a base part; a pivot axis, disposed between the base part and the actuating element, the pivot axis configured and arranged to enable a pivoting movement of the actuating element relative to the base part; and a spring, disposed between the actuating element and the base part and configured to elastically bias the actuating element into a rest position relative to the base part, wherein the spring includes an axis part defining the pivot axis and a spring portion, and having a first end portion which is rectilinear.

2. The actuating unit of claim 1, wherein the axis part, during installation, is pushed into bearing openings formed on the base part, and wherein on the actuating element, either bearing openings are also formed or a resting area for the axis part, against which the axis part rests elastically, is provided.

3. The actuating unit of claim 1, wherein the spring element comprises a second end portion and one of the base part, the actuating element or a part rigidly connected with the base part or the actuating element is configured so as to fix the second end portion of the spring element.

4. The actuating unit of claim 1, wherein the spring element comprises a support part that rests detachably against the actuating element and is elastically biased in relation to the actuating element.

5. The actuating unit of claim 4, wherein the axis part and the support part extend parallel to each other.

6. The actuating unit of claim 4 or 5, wherein the axis part and the support part are connected to each other by a transverse part.

7. The actuating unit of claim 1, wherein the base part is a partial piece of a rail of a longitudinal guide or a component that is rigidly connected to said rail.

8. The actuating unit of claim 1, wherein the axis part of the spring element does not comprise any axial stops as they are normally provided in pivot axes for securing their axial position.

9. The actuating unit of claim 1, wherein the spring element comprises a second end portion and an axial position of the axis part is determined by a fixation of the second end portion.

10. The actuating unit of claim 1, wherein the spring element comprises a second end portion and a spring portion adjoining the second end portion.

11. An actuating unit of a motor vehicle seat, comprising: an actuating element; a base part; a pivot axis, disposed between the base part and the actuating element, the pivot axis configured and arranged to enable a pivoting movement of the actuating element relative to the base part; and a spring, disposed between the actuating element and the base part and configured to elastically bias the actuating element into a rest position relative to the base part, wherein the spring includes an axis part defining the pivot axis and a spring portion, and wherein the rest position is mechanically defined by a stop or a clearance-free engagement of at least one arresting pin.

12. An actuating unit of a motor vehicle seat comprising: an actuating element, a base part, and a spring, wherein at least one of
 (i) the spring forms a pivot defining a pivot axis and the actuating element pivots on the spring relative to the base part, and
 (ii) the actuating element and the base part have holes therein, the spring extending through said holes, and connecting the actuating element to the base part,
 wherein the spring is configured to elastically bias the actuating element toward a rest position relative to the base part.

13. The actuating unit of claim 12, wherein the spring is configured to prevent the base part and the actuating element from separating from each other.

14. The actuating unit of claim 12, wherein the actuating element and the base part have holes therein, the spring extending through said holes, and connecting the actuating element to the base part.

15. The actuating unit of claim 14, wherein the spring is configured to prevent the base part and the actuating element from separating from each other.

* * * * *